United States Patent [19]
Lamberg et al.

[11] Patent Number: 5,585,761
[45] Date of Patent: Dec. 17, 1996

[54] DEMODULATION OF DIGITAL PHASE MODULATED SIGNAL

[75] Inventors: Seppo E. M. Lamberg, Salo; Zhi C. Honkasalo, Helsinki, both of Finland

[73] Assignee: Nokia Mobile Phones Ltd., Salo, Finland

[21] Appl. No.: 152,049

[22] Filed: Nov. 12, 1993

[30] Foreign Application Priority Data

Nov. 14, 1992 [GB] United Kingdom ............. 9223931

[51] Int. Cl.$^6$ ............................................. H04L 27/18
[52] U.S. Cl. .................... 329/304; 375/329; 375/330; 375/281; 375/283
[58] Field of Search ..................... 329/304, 310; 375/281, 327, 328, 329, 330, 331, 332, 333, 283, 280, 282, 324

[56] References Cited

U.S. PATENT DOCUMENTS

| | | | |
|---|---|---|---|
| 3,798,561 | 3/1974 | Bocker | 329/304 |
| 3,818,346 | 6/1974 | Fletcher et al. | 375/85 |
| 3,843,931 | 10/1974 | Sarkilahti | 329/304 |
| 4,414,675 | 11/1983 | Comroe | 375/336 |
| 4,634,990 | 1/1987 | Tate et al. | 375/330 XT |
| 4,879,728 | 11/1989 | Tarallo | 375/80 |
| 5,122,758 | 6/1992 | Tomita | 329/304 |
| 5,367,538 | 11/1994 | La Rosa et al. | 375/329 X |

FOREIGN PATENT DOCUMENTS 2272613  5/1994  United Kingdom ............. 329/304

*Primary Examiner*—Robert Pascal
*Assistant Examiner*—Arnold Kinkead
*Attorney, Agent, or Firm*—Perman & Green

[57] ABSTRACT

A method is disclosed of demodulating a signal (20) modulated by differential quadrature phase shift keying so that two bits of information are coded into each symbol period. The method comprises using a high frequency clock to determine the time taken ($t_1$, $t_2$, $t_3$, $t_4$), for the modulated signal to execute a predetermined number of cycles, such as 21, in the symbol period (T) and comparing the time thereby determined with the time ($t_o$) of execution of the predetermined number of cycles for an unmodulated signal.

12 Claims, 2 Drawing Sheets

DEMODULATION OF DIGITAL PHASE MODULATED SIGNAL

FIELD OF THE INVENTION

This invention relates to a method of an apparatus for demodulating a digital phase modulated signal, a term which is to be construed herein as including a signal arising from frequency modulation where this results in phase changes. The invention is particularly, but not exclusively, concerned with the demodulation of a PSK (Phase Shift Keying) modulated signal. The PSK signal may be modulated to any level, but the invention is particularly, but not exclusively, applicable to a modulation level of four, referred to as QPSK (Quaternary Phase Shift Keying). Further, the invention is particularly concerned with PSK systems where the modulation is differential (DQPSK), i.e. the system responds to changes in phase by comparing a prevailing phase with a preceding phase.

BACKGROUND OF THE INVENTION

The invention was devised to demodulate DQPSK signals in mobile hand-held radios where non-linear receivers are used because of the need to limit power consumption.

From first principles, the optimum solution for demodulating a DQPSK signal is to employ a square-root Nyquist filter at the receiver followed by a coherent detector, and under Rayleigh fading environment non-coherent detection (or differential detection) has often been proved to give the best performance. However, this optimum solution requires the use of linear amplifiers in the receiver, and linear amplifiers consume more power than non-linear log-amplifiers with today's technology. This power consumption problem is particularly true for the Japanese Digital Cellular (JDC) system where, due to the use of a post-detection diversity technique, a dual-receiver structure is needed. A more practical solution for hand-held units here is to adopt one of the conventional techniques for narrowband FM signals where the receiver uses a limiter IF amplifier followed by an analogue frequency discriminator detector.

This is shown in FIG. 1 of the accompanying drawings where the intermediate frequency signal 10 (which consists of a sinusoidal carrier modulated by DQPSK so as to carry transmitted symbol values) is fed to a limiter amplifier 12 and thence to an analogue frequency discriminator 13 having a delay line 14 and a low pass filter 15. The discriminator 13 produces a frequency deviation signal which needs to be integrated over each symbol period to derive an output signal representative of the carrier phase change and, therefore, the transmitted signal. The output of the analogue frequency discriminator 13 is converted to digital format in an analogue to digital converter 16 and then fed to digital hardware 17, in which the signal is integrated and dumped into one of four decision bands depending on the modulation phase which is representative of the transmitted symbol value.

The logarithm of the amplitude of the signal 10 is derived from the limiter amplifier 12 and is fed, via a further analogue to digital converter 18, to the system hardware 17. This is done to deal with antenna diversity, the receiver having two antennas and the system automatically choosing the stronger of the two received signals.

Although discriminator detection provides an almost optimum performance for narrow-band FM, it does not work so well with QPSK modulation, since the latter is not a continuous phase modulation, containing large frequency deviations and requiring a wide band frequency discriminator circuit. Computer simulation results have shown that performance loss of up to 1 dB may be caused by the imperfection of the practical analogue discriminator circuit, both in the Static and Rayleigh fading with diversity. Furthermore, component variation and imbalance in the analogue circuit introduce large DC offset and signal amplitude variation which are difficult to compensate, leading to further performance loss and increase in circuit complexity.

SUMMARY OF THE INVENTION

According to one aspect the invention provides a method of demodulating a digital phase modulated signal having symbol periods, wherein the modulated signal is a repetitive waveform having two predetermined amplitude, including zero, crossing points per cycle, and wherein the signal is demodulated by determining a time for the modulated signal to execute a predetermined number of crossing points in a said symbol period and comparing the time thereby determined with the time of execution of the predetermined number of cycles for an unmodulated signal, thereby to determine the phase shift imparted to the signal by the modulation in the symbol period.

Preferably, the signal is modulated by multi-level phase shift keying, conveniently differential phase shift keying and to a level of four, i.e. Differential Quaternary Phase Shift Keying.

According to another aspect the invention provides apparatus for demodulating a digital phase modulated signal having information coded into symbol periods, wherein the modulated signal is a repetitive waveform having predetermined amplitude, including zero, crossing points per cycle, comprising timing means for determining the time for the modulated signal to execute a predetermined number of crossing points in each symbol period and for relating said time to the time for the unmodulated signal to execute the predetermined number of crossing points in the symbol period, all allocation means responsive to the timing means for allocating a phase shift to each symbol period in order to derive the information.

Preferably, the timing means in the apparatus include a system clock having a frequency substantially greater than the frequency of the signal, the clock count being representative of the symbol coded into each symbol period.

An embodiment of the invention will now be further described, by way of example, with reference to FIGS. 2 to 4 of the accompanying drawings, in which.

DESCRIPTION OF PREFERRED EMBODIMENT

Figure 2:
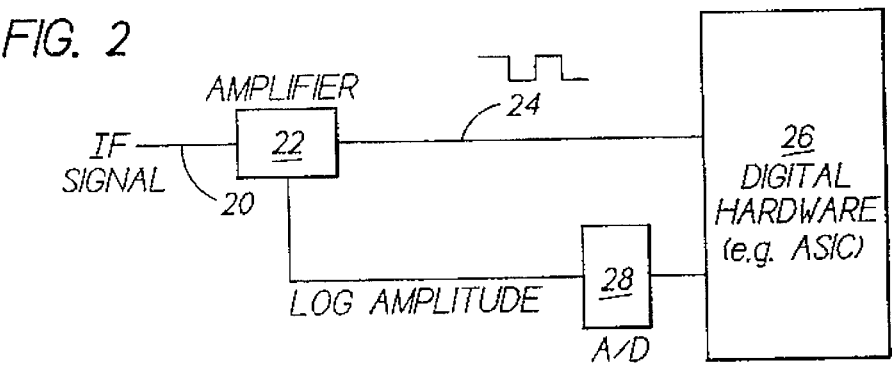
FIG. 2 is a block circuit diagram of a demodulator according to the invention.

The demodulator of FIG. 2 is intended to be included in the receiver section of a hand-held mobile radio. The radio has a pair of antennas which cooperate with a conventional tuning circuit to pick up the transmitted signal. This will consist of a sinusoidal carrier modulated by DQPSK to carry the transmitted information. The carrier is converted to a fixed intermediate frequency of 450 KHz, in accordance with conventional practice, to provide an intermediate frequency (IF) signal indicated at 20 in FIG. 2 and FIG. 3.

The signal 20 is fed to a limiter amplifier 22 which transforms the signal 20 to a rectangular output waveform 24 (FIG. 3), by taking a narrow slice of the signal about the value zero and amplifying the sliced signal to the required level. The variations in the phase of the signal 20 are thus preserved in the signal 24.

The signal 20 is generally sinusoidal but in each symbol period T the phase of the carrier is varied or modulated to code a transmitted symbol value. The modulation is to level four, meaning that in each symbol period, the phase is modulated to any one or four different levels. This four level modulation enables two bits of binary information to be coded by each phase shift, thus:

Phase shifted by +π/4 radians means 00 bit pair (or symbol value +1)

Phase shifted by +3π/4 radians means 01 bit pair (or symbol value +3)

Phase shifted by −π/4 radians means 10 bit pair (or symbol value −1)

Phase shifted by −3π/4 radians means 11 bit pair (or symbol value −3)

Figure 4:
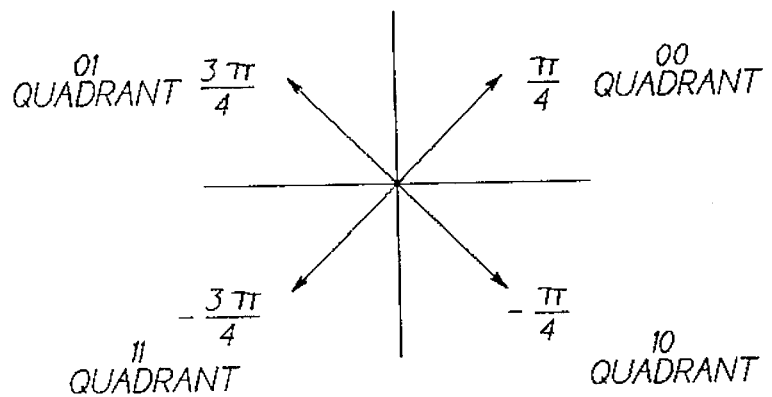
FIG. 4 is a phase diagram illustrating QPSK modulation.

This is illustrated in FIG. 4.

Hence, the phase shift or the signal 20 in each symbol period T is representative of the transmitted bit pair of that symbol. The phase of the carrier does not alter suddenly at a symbol period transition. There is a progressive alteration in phase throughout the symbol period, the fastest change in phase occurring in the central region of the symbol period T.

As mentioned, the limiter amplifier 22 changes the generally sinusoidal signal 20 into a signal 24 of a repetitive substantially square waveform having two very precisely defined zero crossing points per cycle of the signal 24. The alteration in the phase of the signal 24 caused by the modulation has the result of causing the signal 24 to undergo different numbers of cycles in the symbol period T, depending on the phase of the modulation. This in turn means that the time taken for the signal 24 to execute a predetermined number of cycles in the symbol period T will indicate the phase of the modulation in that period, providing that the predetermined number of cycles is sufficiently large to span a representative proportion of the symbol period T. The demodulator shown in FIG. 2 detects the time taken for the signal 24 to execute 21 complete cycles, i.e. the time taken between 43 consecutive zero crossing points. The complete symbol period T corresponds to 21³⁄₇ cycles of the signal 20 or 24, or 21 cycles represents about 98% of the symbol period.

Figure 3:
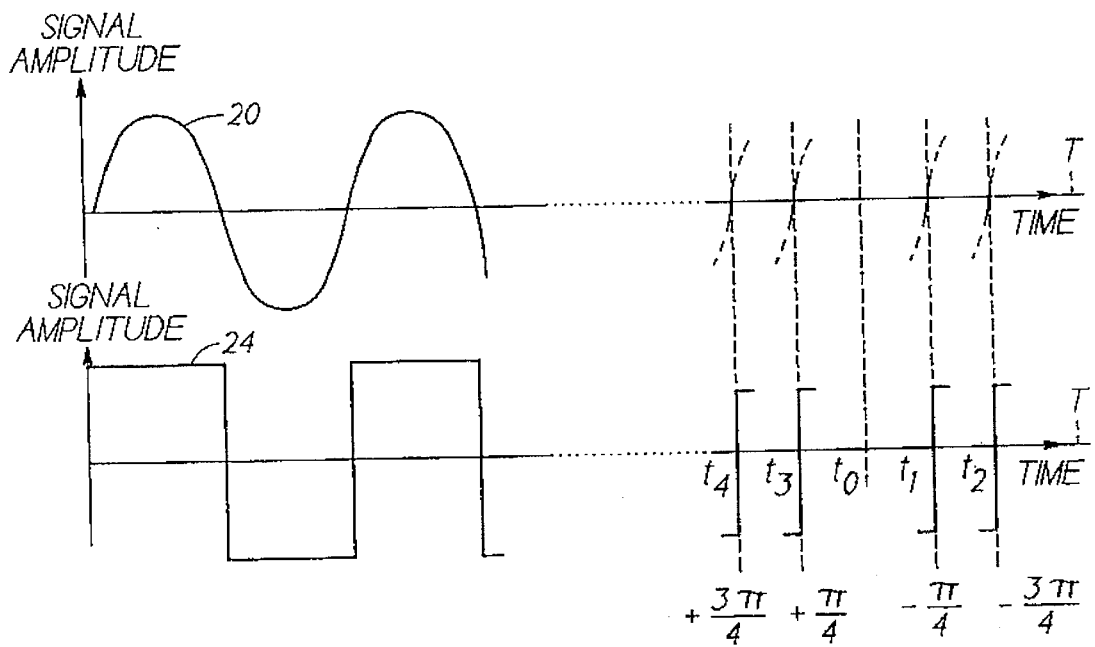
FIG. 3 shows waveforms for explaining the operation of the demodulator.

Referring to FIG. 3, in the absence of modulation, the signal 24 would take a period of time represented to $t_o$ to execute 21 complete cycles. If the carrier has been modulated by phase −π/4 the signal 24 will take longer ($t_1$) to execute 21 complete cycles. Similarly, to execute 21 complete cycles, the signal 24 will take $t_2$ for phase modulation of −3π/4, $t_3$ for phase modulation of +π/4 and $t_4$ for phase modulation of +3π/4. Times $t_3$ and $t_4$ are less than $t_o$ because if positive phase is imparted the average frequency of the signal 24 will be increased and, therefore, the time taken to complete 21 cycles will be reduced.

Detection of the time to execute 21 complete cycles is carried out by using a system clock of, for example, 16.8 MHz to time 43 zero crossing points of the signal 24. In the case of a perfectly square wave signal 24, it would be possible to count half cycles, in which case the demodulator would count the time taken between an even number of crossing points.

The system clock of 16.8 MHz undergoes 800 cycles in the symbol period T. In the time which it takes for the unmodulated signal 24 to undergo 21 cycles (43 zero crossing points), the system clock passes through 784 cycles. If the signal 24 has been modulated −π/4 in a particular symbol period, the system clock will count 788.6 (rounded to 788) cycles. The relationship between system clock count and modulation phase is set out below.

| System Clock Count | Modulation Phase |
| --- | --- |
| 784 | zero |
| 788 | $-\frac{\pi}{4}$ |
| 798 | $-\frac{3\pi}{4}$ |
| 780 | $+\frac{\pi}{4}$ |
| 770 | $+\frac{3\pi}{4}$ |

Hence, the system clock count in any symbol period indicates the phase of modulation, enabling the corresponding bit pairs (01, 00, 11, 10) in the symbol period to be retrieved.

Clock analysis and dumping (by allocation means) into decision bands are performed in the system digital hardware 26 (called ASIC) from which the signal is fed to a channel decoder and then to a speech encoders and to the audio reproduction section of the radio.

For the purpose of resolving which of the two signals received by the pair of antennas is the stronger, the demodulator of FIG. 2 derives the logarithm of the amplitude of the signal 20 and converts this, by an analogue to digital converter 28, to digital form which is then fed to the system hardware 26 where the decision is made.

The following passage gives a more mathematical analysis of how the demodulator of FIG. 2 functions.

As has been mentioned, the principle of DQPSK modulation scheme is to change (or modulate) the carrier (a sine wave) phase by either ±π/4 or else ±3 π/4 rads over one symbol period, depending on the value of the transmitted symbol (+/−1 or +/−3) over that period. Although the rate of this phase change (i.e. frequency deviation) is very much greater around the middle of the symbol period relative to the start/end of the symbol period (hence large frequency deviation), the average frequency deviation over one symbol period is quite low. For example in the described system, the average frequency deviation F_dev for a symbol value β and symbol period T would be $$F\_dev = \beta \times \frac{\frac{\pi}{4}}{T\_sym} \quad \text{(rads/sec)}$$

$$= \beta \times \frac{\pi}{4} \times \frac{F\_sym}{2\pi} \quad \text{(Hz)}$$

$$= F\_sym \times \frac{\beta}{8} \quad \text{(Hz)}$$

$$= 2.625 \times \beta \quad \text{(kHz)}$$

where β+±1 and ±3 etc., and $F_{sym}$=21 kHz.

By measuring the time taken for the modulated carrier (which has an average frequency of F_carrier+F_dev over one symbol period) to rotate through a fixed number of cycles, the transmitted symbol value β over that symbol period is established.

Let the carrier frequency be F_carrier (450 kHz), then over one symbol period the unmodulated carrier would have rotated through $$\frac{F\_carrier}{F\_sym} = \frac{450k}{21k} = 21\frac{3}{7}$$

cycles. So let us now consider the time taken for a modulated carrier (at frequency of F_carrier+F_dev) to go through exactly 21 cycles or N cycles, where N+

$$\frac{F\_carrier}{F\_sym} - \Delta \quad \left(\text{and } \Delta = \frac{3}{7}\right), \text{ then}$$

$$\text{Time Taken} = \frac{N}{F\_carrier + F\_dev}$$

$$= \frac{\left(\frac{F\_carrier}{F\_sym} - \Delta\right)}{(F\_carrier + F\_dev)}$$

$$= \frac{\left(\frac{F\_carrier}{F\_sym} - \Delta\right)}{F\_carrier} \times \left(1 - \frac{F\_dev}{F\_carrier}\right)$$

since F_dev is much smaller than F_carrier. Meanwhile, the expected time taken for an unmodulated carrier to go through exactly N cycles would be:

$$\text{Expected Time} = \frac{\left(\frac{F\_carrier}{F\_sym} - \Delta\right)}{F\_carrier}$$

Hence, the extra time taken (due to modulation) must be $$\text{Time Taken} - \text{Expected Time} = \frac{\frac{F\_carrier}{F\_sym} - \Delta}{F\_carrier} \times \left(\frac{-F\_dev}{F\_carrier}\right)$$

$$= \frac{\left(\frac{F\_carrier}{F\_sym} - \Delta\right)}{F\_carrier} \times \left(\frac{-\frac{\beta}{8} F\_sym}{F\_carrier}\right)$$

$$= \frac{-\frac{\beta}{8}}{F\_carrier} \times \left(1 - \Delta \times \frac{F\_sym}{F_{carrier}}\right)$$

Using the fact that $$\Delta \times \frac{F\_sym}{F\_carrier} = \frac{3}{7} \times \frac{21k}{450k} = 0.02$$

and can be ignored, therefore $$\text{extra time} = \frac{1}{F\_carrier} \times \left(\frac{-\beta}{8}\right) \Rightarrow \propto \beta$$

Therefore, by measuring the time taken for the modulated carrier to go through N (N=21) cycles, one can establish the corresponding symbol value β over that symbol period. Time interval measurement is used, employing a frequency counter at a clock frequency to provide sufficient resolution.

The ASIC system clock rate is 16.8 MHz. Thus the count number (number of cycles of 16.8 MHz clock) for a modulated carrier to rotate through 21 cycles (of 450 kHz carrier) must be:

$$N\_count = \frac{\text{Time Taken}}{T_{counter}}$$

$$= 21 \times \frac{F\_counter}{F\_carrier} \times \left(1 - \frac{\beta}{8} \times \frac{F\_sym}{F\_carrier}\right)$$

$$= 21 \times \frac{16.8M}{450k} \times \left(1 - \frac{\beta}{8} \times \frac{21k}{450k}\right)$$

$$= 784 - \frac{14}{3} \times 0.98 \times \beta$$

while the expected count number for an unmodulated carrier over the same period is $$N\_ideal = \frac{\text{Expected Time}}{T\_counter}$$

$$= 21 \times \frac{F\_counter}{F\_carrier}$$

$$= 21 \times \frac{16.8M}{450k}$$

$$= 784$$

and $$\delta N = N\_count - N\_ideal$$

$$= \frac{-14}{3} \times 0.98 \times \beta$$

$$= -4.57 \times \beta$$

defines the corresponding symbol value. This implies roughly 5-bit resolution. Its BER performance can be verified by means of computer simulations. Although in principle both edges of the 16.8 MHz system clock could be used for counting, which effectively doubles the resolution, it is not recommended since in practice the clock cannot always guarantee exactly 50/50 mark/space duty cycles.

Since all the clocks (f_counter, F_carrier and F_symbol) contain the same ppm frequency error, the clock errors will cancel each other out in the above equations for N_count and N_ideal. This means that F_counter does not have to be exactly 16.8 MHz and the method will still work.

Using system clock of 16.8 MHz, one symbol period is exactly 800 cycles. The following operation to generate each symbol value shall start at Master_clk MOD 800=0. Although the actual design of ASIC may be different from that below, the principle remains the same.

1. The counter is reset to zero (or given fixed value CO) before start of the symbol period.
2. After the start of the symbol (Master_clk MOD 800= 0), the counter starts at (is enabled by) the very first edge (positive or negative, whichever comes first) of the 450 kHz carrier.
3. The counter stops at (is dis-enabled by) the 43rd edge of the 450 kHz carrier, giving exactly 21 whole cycles. The content of the counter is equal to δN, if the initial value CO is appropriately chosen.

For example, if 7-bit counter is used, with CO=112, the counter result of "0" would correspond to N_ideal of 784, and the counter result would range from −64 to +63.

Figure 1:
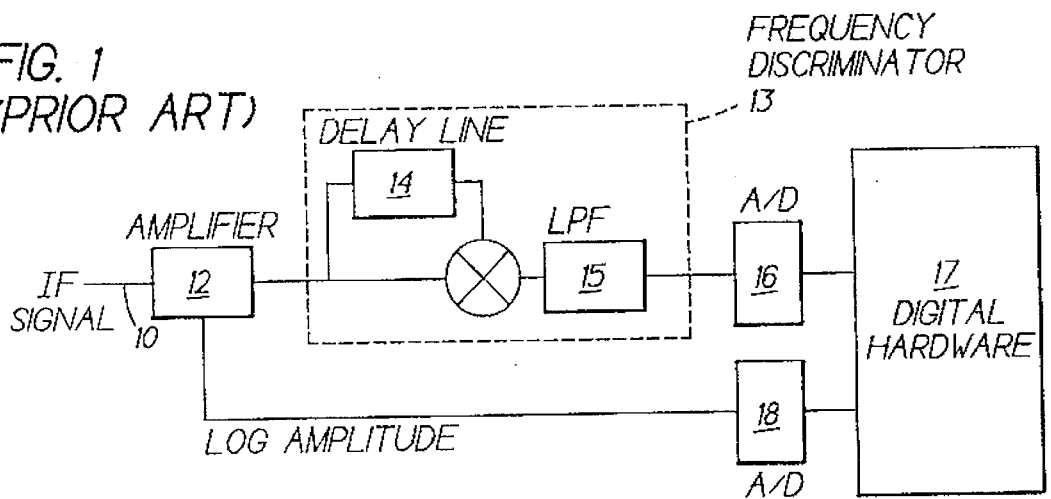
FIG. 1 is a block circuit diagram of a conventional demodulator.

Note that sometimes the 43rd edge of 450 kHz carrier may arrive after Master_clk MOD 800 becomes zero again, in which case the operation for the current symbol has to be extended into the next symbol period. This "over-lapping" between adjacent symbols must be taken into consideration when designing the ASIC. In contrast to the analogue method, the digital method described has no separate stage of producing the frequency deviation signal. The counting process combines this with the integrate and dump operation to provide the phase change over the symbol period, and the counting clock of 16.8 MHz should give a sufficient wide frequency band to cover the large frequency deviation in the QPSK signal. Therefore, there should not be any additional requirements of RF compared to the conventional analogue FD system, as far as the generation of the 450 kHz limited IF signal is concerned. Furthermore, since whole cycles of 450 kHz carrier used (21 cycles), the unmodulated 450 kHz carrier does not have to have exactly 50/50 mark/space duty cycles.

the described digital demodulation method overcomes the shortfalls of the analogue discrimination of FIG. 1 by directly taking the IF signal at the output of the limiter-amplifier into the customer designed digital hardware 26

(ASIC) where frequency discrimination and integrate and dump functions are performed in one single step. In addition to the removal of the analogue discriminator circuit 13, since the limited IF signal is now fed directly into the digital hardware 26, no ADCs like 16 are needed, providing further saving in power consumption and likely reduction in the receiver physical size.

The invention is applicable to the demodulation of signals other than those modulated by phase shift keying. For example, the invention is applicable to all continuous phase frequency shift keying systems and certain continuous phase modulation systems.

We claim:

1. A method of demodulating a digital phase modulated signal having symbol periods, wherein the digital phase modulated signal is a repetitive waveform having two predetermined amplitude, including zero amplitude, crossing points per cycle, and wherein the digital phase modulated signal is demodulated by determining a total time for the digital phase modulated signal to execute a predetermined number of a plurality of crossing points during a symbol period and without regard for a temporal relationship of individual ones of the crossing points to a timing reference signal during the symbol period, and comparing the time thereby determined with a time of execution of the predetermined number of crossing points for an unmodulated signal, thereby to determine a phase shift imparted to the digital phase modulated signal by the digital phase modulation in the symbol period.

2. A method according to claim 1, wherein the predetermined number of crossing points is an uneven number, so that the digital phase modulated signal executes an integral number of cycles in the determined time.

3. A method according to claim 1, wherein the digital phase modulated signal is modulated by multi-level phase shift keying.

4. A method according to claim 3, wherein the digital phase modulated signal is modulated by differential phase shift keying.

5. A method according to claim 3, wherein the digital phase modulated signal is modulated by quadrature phase shift keying.

6. A method according to claim 1, wherein the digital phase modulated signal is fed directly into hardware which includes a digital frequency discriminator to perform the demodulation.

7. A method of demodulationg a signal modulated by differential quadrature phase shift keying so that two bits of information are coded into each symbol period of the modulated signal which is formed by a repetitive waveform having two zero crossing points per cycle, and wherein a system clock of a substantially higher frequency than a frequency of the modulated signal is used to count clock pulses during a time taken for the modulated signal to execute a predetermined uneven number of crossing points within a particular symbol period, deriving a count difference by subtracting from a detected count a reference count corresponding to a time of execution of the predetermined number of cycles for an unmodulated signal, using the count difference to allocate to the particular symbol period one of four possible phase shifts provided by differential quadrature phase shift keying and thereby extracting the two bits of information coded into the particular symbol period, and wherein the step of extracting is accomplished without regard for a temporal relationship of individual ones of the crossing points to a reference signal during the symbol period.

8. Apparatus for demodulating a digital phase modulated signal having information coded into symbol periods, wherein the digital phase modulated signal is a repetitive waveform having predetermined amplitude, including zero amplitude, crossing points per cycle, comprising timing means for determining a first time for the modulated signal to execute a predetermined number of crossing points in each symbol period and for relating the first time to a second time for an unmodulated signal to execute the predetermined number of crossing points in said each symbol period, and allocation means responsive to the timing means for allocating a phase shift to each symbol period in order to derive the information coded into each symbol period, wherein said demodulating apparatus operates without regard for a temporal relationship of individual ones of the crossing points to a reference signal during the symbol period.

9. Apparatus according to claim 8, wherein said timing means include a system clock having a frequency substantially greater than a frequency of the digital phase modulated signal, the clock count being representative of the information coded into each symbol period.

10. Apparatus according to claim 8, wherein the timing means and the allocation means are included in system hardware.

11. A method for demodulating a phase modulated carrier signal that encodes a symbol value during a symbol period, comprising the steps of:

providing a phase modulated carrier signal having an average frequency deviation F_dev, for a symbol value β during a symbol period t_sym, that is given by $$F\_dev = \beta((\pi/4)/(T\_sym)),$$

where β can have a value equal to a positive odd integer or a negative odd integer;

measuring an amount of time required for the provided phase modulated carrier signal to rotate through a predetermined number of whole cycles by counting crossing points of the signal without regard for a temporal relationship of individual ones of the crossing points to a timing reference signal; and correlating the measured amount of time with a value of β that is encoded within the symbol period.

12. A method as set forth in claim 11 wherein the step of measuring includes the steps of:

initializing a counter prior to a start of a symbol period;

enabling the counter to count a signal having a predetermined frequency, the step of enabling using a first edge of the phase modulated carrier signal that occurs after the start of the symbol period; and disabling the counter from counting after a predetermined number of edges of the phase modulated carrier signal occur during the symbol period; wherein the step of correlating includes a step of examining a content of the counter after the step of disabling the counter.

* * * * *